(12) United States Patent
Colley et al.

(10) Patent No.: US 7,912,739 B2
(45) Date of Patent: Mar. 22, 2011

(54) METHOD FOR HEALTH PLAN MANAGEMENT

(75) Inventors: John Lawrence Colley, Richmond, VA (US); Ronald Hampton Bargatze, Richmond, VA (US); Timothy Gerard O'Shea, Richmond, VA (US)

(73) Assignee: Dominion Ventures, LLC, Glen Allen, VA (US)

( * ) Notice: Subject to any disclaimer, the term of this patent is extended or adjusted under 35 U.S.C. 154(b) by 1971 days.

(21) Appl. No.: 10/691,762

(22) Filed: Oct. 23, 2003

(65) Prior Publication Data

US 2004/0103002 A1     May 27, 2004

Related U.S. Application Data

(60) Provisional application No. 60/429,290, filed on Nov. 26, 2002.

(51) Int. Cl.
*G06Q 40/00*     (2006.01)
(52) U.S. Cl. .......................................... 705/4
(58) Field of Classification Search ............... 705/2, 4
See application file for complete search history.

(56) References Cited

U.S. PATENT DOCUMENTS

| | | | |
|---|---|---|---|
| 5,523,942 A | 6/1996 | Tyler et al. | |
| 5,550,734 A * | 8/1996 | Tarter et al. | 705/2 |
| 5,655,085 A * | 8/1997 | Ryan et al. | 705/4 |
| 5,724,379 A | 3/1998 | Perkins et al. | |
| 6,009,402 A | 12/1999 | Whitworth | |
| 6,078,890 A | 6/2000 | Mangin et al. | |
| 6,092,047 A | 7/2000 | Hyman et al. | |
| 6,330,541 B1 | 12/2001 | Meyer et al. | |
| 6,456,979 B1 | 9/2002 | Flagg | |
| 6,510,419 B1 | 1/2003 | Gatto | |
| 7,698,158 B1 * | 4/2010 | Flagg | 705/4 |
| 2001/0021911 A1 | 9/2001 | Ohmoto et al. | |
| 2001/0037214 A1 | 11/2001 | Raskin et al. | |
| 2002/0010597 A1 | 1/2002 | Mayer et al. | |
| 2002/0049617 A1 | 4/2002 | Lencki et al. | |
| 2002/0077849 A1 | 6/2002 | Baruch et al. | |
| 2002/0091613 A1 | 7/2002 | Kendall et al. | |
| 2002/0095316 A1 | 7/2002 | Toan et al. | |
| 2002/0103680 A1 | 8/2002 | Newman | |
| 2002/0120540 A1 | 8/2002 | Kende et al. | |
| 2002/0128879 A1 | 9/2002 | Spears | |
| 2002/0147617 A1 | 10/2002 | Schoenbaum et al. | |
| 2002/0188480 A1 | 12/2002 | Liebeskind et al. | |
| 2003/0009355 A1 | 1/2003 | Gupta | |
| 2003/0065534 A1 | 4/2003 | McCartney | |
| 2003/0078817 A1 * | 4/2003 | Harrison et al. | 705/4 |
| 2003/0093304 A1 | 5/2003 | Keller et al. | |
| 2003/0120511 A1 | 6/2003 | Legnini | |
| 2003/0236685 A1 * | 12/2003 | Buckner et al. | 705/4 |

* cited by examiner

*Primary Examiner* — C. Luke Gilligan
*Assistant Examiner* — Valerie Lubin
(74) *Attorney, Agent, or Firm* — Thomas & Karceski, P.C.

(57) ABSTRACT

A method for managing health plans includes the use of theoretically derived mathematical models. The methods may be used in the analysis of health insurance products. The method may also assist in the selection of a particular health plan's benefit and contribution strategy. The analysis may further be used in the selection of a health plan's funding arrangement.

9 Claims, No Drawings

METHOD FOR HEALTH PLAN MANAGEMENT

This application claims the benefit of filing of U.S. Patent Application No. 60/429,290, filed Nov. 26, 2002, which is incorporated by reference herein as if set forth in its entirety.

The present invention relates to the management of health insurance plans. The management method includes the use of theoretically derived mathematical models in the analysis of health insurance products. The analysis can be used for the assessment and comparison of various, different health insurance plans. The analysis may further assist in the selection of a particular health plan's benefits and contribution strategy. The analysis may also assist in the selection of a health plan's funding arrangement.

BACKGROUND

A. Current Assessment and Selection of Insurance Products

At present, agents, brokers, or carrier marketing representatives typically present consumers (generally, "group decision makers" for employer-based plans) with a menu of health insurance product coverage options. Choices entail carriers, products (e.g., HMO vs. PPO), and myriad benefit design features (e.g., "gate keeping", higher or lower co-pays or coinsurance amounts, out-of-pocket maxima, etc.). The decision maker generally is presented with a set of choices, each with a price plus dozens of benefit design attributes that influence the quality of coverage. Because benefit designs are so complex and multifaceted, it is very difficult for the consumer to characterize quality of coverage. Therefore, premiums, which are easily discernible and understood, typically drive the decision-making process.

Industry-standard practice is to present all of the important product attributes in the form of tables or lists. Top consultants distinguish themselves from their competition by presenting longer or more complete lists. These lists and tables of plan attributes can account for scores of pages in documents that present market options to the group purchasers of health care. The problem with this approach is that no human brain can assimilate and integrate all of these features into an accurate and meaningful characterization of value (the most coverage for the money). Qualitative impressions of quality are generally formed from a handful of attributes that the decision maker happens to notice or emphasize. In the industry-standard decision-making process, only price is quantitatively assessed. Value, or price relative to quality, is relegated to the realm of qualitative impression, because the quality component of the value consideration can only be characterized in a qualitative way.

B. Current Methods for Choosing a Funding Arrangement

Groups of more than 100 employees generally have the option to pay a carrier to bear full risk for their incurred claims, or they can retain some or all of that risk by "self-insuring", otherwise known as "self-funding". Specifically, large groups can "fully insure", i.e., pay a fixed premium and offload all risk for incurred claims, or can "self-fund" and retain some or all of the claim risk for themselves. The manner and degree to which the group is insured as opposed to "self-funded" is often referred to as "funding arrangement".

Generally, consultants, agents, and brokers offer advice regarding funding arrangement based upon generalizations and industry standard practices regarding groups of a particular size. Consideration of group-specific issues, such as the tolerance for near-term volatility vs. desire for long-term minimum cost, tends to be qualitative, vague and general. In mixed funding arrangements (i.e., self-funding with reinsurance) decisions to purchase specific types and amounts of reinsurance tend to be based upon generalizations and industry standard practices. These generalizations and standard practices are biased toward over-insuring, which favors carriers to the detriment of their group customers. What is missing is a complete and quantitative assessment of possible economic outcomes with quantitative assessments of the probability of those outcomes across a representative probability distribution of claim costs.

C. Current Methods for Tracking and Trending Group Experience

With a frequency that depends upon carrier, group size, and funding arrangement, carriers provide groups with periodic data about the group's claim experience. The industry standard practice among consultants, brokers, and agents is to simply pass the carrier data on to the group, sometimes with a brief cover letter broadly characterizing the experience as "good", "bad", "better than average", etc. There is typically no value-added quantitative analysis that turns the data into information upon which health plan management decisions might be made.

D. Current Methods for Management of Benefit Design

Typically, benefit design is addressed on a year-by-year, renewal-by-renewal basis, with no emphasis on multiyear planning. Within the one-year time frame of typical benefit decision-making, decisions are typically biased toward inaction and/or maintenance of benefit richness. The result is loss of co-pay leveraging, loss of intended behavioral effects of benefit design, delayed action on necessary plan changes, contributions to premium that employees cannot afford, and employer cost increases greater than ambient inflation. The lack of a planning tool for identifying appropriate incremental changes results in less frequent changes which are large and unsettling to the plan membership.

E. Current Methods for Formulation of Contribution Strategy

Typically, both employer and employee contribute to the payment of premiums in a group health insurance plan. The balance of those contributions comprises the group's contribution policy or strategy. Contribution policy tends to be implemented annually with no consideration of long-term (i.e., multiyear) strategic concerns. Near-term budget imperatives and/or anecdotally based impressions of employee tolerance for premium increases tend to drive the decision-making process. Lack of a multiyear planning tool prevents groups from identifying changes that will be necessary, given likely future premium increases. Lack of a strategic focus on contribution adversely affects selection dynamics and enrollment, and ultimately threatens plan viability.

DESCRIPTION OF METHODS

The present method of health plan management differs from all previous methods by virtue of its quantitative nature, underlying mathematical models and algorithms, and synthesis of disparate issues and attributes. The method provides decision makers for group health plans with information not previously available to them. The method (named BENEFIT SELECT$^{SM}$ in its entirety) does this through its five (5) constituent modules:

1. Assessment and comparison of health insurance products (VALUE SELECT$^{SM}$);
2. Selection of a health plan funding arrangement (FUNDING SELECT$^{SM}$);
3. Tracking of a health plan group's claim history (COST TRACKER$^{SM}$);
4. Selection of a health plan's benefit features (BENEFIT MANAGER$^{SM}$); and
5. Formulation of a health plan's contribution strategy (CONTRIBUTION MANAGER$^{SM}$).

Each of these modules will be addressed herein. Also, each of the modules will typically be referred to by the service marks noted above.

The VALUE SELECT$^{SM}$ module provides for each product to be considered in terms of a single value index (indicative of the most coverage for the money), an estimate of the expected average annual out-of-pocket cost per employee (a function of each product's benefit design), and an index of the product's "richness" of coverage. In addition to these calculations, the VALUE SELECT$^{SM}$ module also summarizes expected costs by employee and employer subsets, given the employer's contribution formula. The FUNDING SELECT$^{SM}$ module allows a group decision maker to compare self-funded options to one another and to insured options across a spectrum of possible claim costs, with probabilities that those claim costs will occur. The model assesses premium costs and claim costs (with probabilities) associated with potential levels of specific stop loss and aggregate stop loss insurance. The COST TRACKER$^{SM}$ module provides periodic group reporting in a format succinct enough for management review, at granularity appropriate for plan management decision-making, and in terms of parameters that are both stable and meaningful. "Run rates" and trends are produced for important subsets of plan experience (e.g., pharmacy costs, inpatient hospital costs, etc.) by means of rolling averages and regression models. The BENEFIT MANAGER$^{SM}$ module provides unique multiyear benefit design planning capability, and permits the user to maintain or alter a plan's index of richness smoothly and according to strategic design. The CONTRIBUTION MANAGER$^{SM}$ module provides a unique multiyear planning capability for planning and execution of contribution strategy.

I. Assessment and Comparison of Health Insurance Products

VALUE SELECT$^{SM}$

The VALUE SELECT$^{SM}$ module compares health insurance products to one another on the basis of value (coverage for the money) by means of a value index that is calculated for each product assessed. VALUE SELECT$^{SM}$ also creates an estimate of out-of-pocket costs that will be incurred as a function of benefit design (e.g., co-payments, coinsurance amounts and deductibles). Estimation of out-of-pocket costs permits the calculation of an index of richness for each product evaluated.

For each health insurance option evaluated, a value index is calculated. Indices represent value relative to a standard value of 1.0. In most cases, renewal of the group's incumbent product is taken as the standard for comparison, but any health insurance product could be selected as the standard. In the example of an incumbent plan used as a standard, the renewal premium for the incumbent plan's set of benefits becomes the expected premium for that particular set of benefits. Its value index is defined as 1.0. Each alternative to renewal of the incumbent product (or other standard product) receives a value index that reflects the ratio of its expected premium cost to its actual premium cost. A higher value index, (i.e., higher ratio of expected premium to actual premium) indicates a better value, or more coverage for the money.

Expected premiums for each alternative product reflect the assumption that each departure in benefit design from the incumbent product should be accompanied by a corresponding premium departure. VALUE SELECT$^{SM}$ handles departures in benefit design in each of three different categories, in three different ways. First, a difference in a co-payment or coinsurance amount is handled with a two-step process that first multiplies payment increments and decrements by typical utilization or cost levels, then multiplies the result by a behavioral multiplier for the pertinent type of service. Second is the method for assessing deductibles and out-of-pocket maxima. The impact of a deductible is estimated by generating the log normal distribution of out-of-pocket costs that exists independent of the deductible, and then subjecting the distributed values to the deductible amount in a sequential fashion. The impact of an out-of-pocket maximum is determined in the same manner, except that the distributed values are subjected to the effect of a maximum. Third, other categories of benefit departures are assigned a premium impact by the VALUE SELECT$^{SM}$ user based upon industry knowledge, published or private health services research, survey research, or customer preference. Prominent attributes in this "other" category are primary care gate keeping, formulary management, networks, and out-of-network benefit levels.

The first category of benefit design features (e.g., co-payments and coinsurance) is handled in VALUE SELECT$^{SM}$ via a two-step process involving average utilization and behavioral multipliers. (A co-payment is a form of coinsurance, but the terms are used together herein for clarity and inclusiveness.) Incremental co-payments and coinsurance amounts should be accompanied by decrements in premium. Conversely, decrements in co-payments and coinsurance amounts cause expected premiums to rise. Resultant increments and decrements in expected premiums are calculated by VALUE SELECT$^{SM}$ in a two-step process, then added together to net the overall premium impact of the collective departures from the index plan. For illustrative purposes, consider an unrealistically simple benefit design that has only two relevant co-payment features: $10 per office visit and $10 per prescription. Imagine that normative data leads us to anticipate 10 office visits per employee-year and 10 pharmacy prescriptions per employee-year. The expected average out-of-pocket costs per employee-year would be $10 per visit times 10 visits ($100), plus $10 per prescription times 10 prescriptions ($100), or $200 total. Note that this estimate of expected out-of-pocket costs is in itself one useful output of VALUE SELECT$^{SM}$, and one that is not routinely provided to customers in the health insurance market.

Imagine now that this index product (Product A) is being compared to another (Product B) that has $15 co-payments per office visit and per prescription. The $5 increment in co-payment is multiplied by the average utilization (10 each for visits and prescriptions), yielding a $100 increment in expected out-of-pocket payment ($300 is the total expected out-of-pocket cost for the alternative product, B). Clearly, one would expect to pay a lower premium for the alternative product than for the richer index product, but how much less should one expect to pay? If higher co-payments had no effect on utilization (i.e., demand for office visits and prescriptions were completely inelastic and insensitive to price), then the expected premium would be $100 lower than the index product's premium. However, demand for covered medical services is elastic (price sensitive), and fewer services are incurred when out-of-pocket payments are higher. This effect on utilization is handled in VALUE SELECT$^{SM}$ with a table of behavioral multipliers for each type of service (based on empirical observation and on industry experience) that characterize the ratio of claim cost decrement to out-of-pocket increment. In our example, imagine that the behavioral multiplier for both visits and prescriptions is 2 (i.e., because of effects on utilization, a $1 increment in out-of-pocket payments results in a claim-cost decrease of $2). One would then expect the alternative product B to cost $200 less than the index product A. If the price of the index product were $2,000 per employee-year, then the expected price of the alternative product would be $1,800 ($200 less than the index product). If its actual price were $1,850, then its value index would be 0.97 ($1800 divided by $1850), indicating that it is an inferior value, relative to A. Clearly, the alternative product is less "rich" (i.e., expected out-of-pocket costs are higher). Its index of richness (a novel construct in BENEFIT SELECT$^{SM}$ that is useful for benefit management purposes) is 16% ($300 expected out-of-pocket cost divided by $1850 premium). By contrast, Product A's index of richness is 10% ($200 out-of-pocket divided by $2000 premium).

The second category of benefit design features impacting expected premium (e.g., deductibles and out-of-pocket maxima) are also handled by VALUE SELECT$^{SM}$ in a statistical fashion. Imagine that the index product described above (A) were altered to produce a new alternative plan (C) that differs from A only by the presence of a $50 front-end deductible. Clearly, the deductible will increase out-of-pocket costs, and in return for this increase, one would expected a lower premium. But how much higher will out-of-pocket costs be, and how much lower should premiums be? Clearly, the increment in out-of-pocket costs will be some fraction of $50, because the most that the deductible can add for an individual is $50, while for many individuals the increment will be much less. For example, an individual within the group incurring no claims would have no incremental out-of-pocket cost. An individual incurring two prescription drug claims at a cost of $20 each would experience an incremental cost of $20 (with product A, out-of-pocket costs would be two $10 co-payments times two prescriptions, or $20; with product C, out-of-pocket costs would be the full cost of two $20 prescriptions, or $40, because the deductible has not been met).

To determine the average premium impact of the $50 deductible, carriers would employ traditional actuarial methods that depend upon empirical data about the effect of a deductible of that size on a set of benefits otherwise similarly rich. VALUE SELECT$^{SM}$ uses a mathematical model to serve as proxy for the empirical data that are generally lacking in the purchasers' universe. The key assumption is that a group's claims are log normally distributed. (This theoretical model provides an excellent "goodness of fit" when correlated with actual claim data). Clearly, claim data are not normally distributed—if average claims were $1,000 per year, one would have individual claimants at the $10,000 level, but there would be no -$9,000 claimants. In reality, the probability of a claimant being one log higher than average is about the same as the probability of being one log lower. Said another way, if the mean is 1,000, or $10^3$, 10,000 or $10^4$ is about as likely as 100, or $10^2$. It is immaterial whether base-10 logs or natural logs are used to construct theoretical claim distributions. If the mean is $e^x$, $e^{x-1}$ is about as likely as $e^{x+1}$. Despite the elegant simplicity and apparent utility of this observation, it is not generally known and has not been applied commercially prior to BENEFIT SELECT$^{SM}$.) An example of such a distribution created from this theoretical construct is given below.

TABLE 1

Probabilities and Costs of Individual Claimants Within A Group

| Members 1000 Clms | Claims $1,000,000 Log Clms | Clms PMPY $1,000 % Less | Mean 2.132502 Prob. | SD 0.821354 $ per band |
|---|---|---|---|---|
| $10 | 1.000000 | 8.3975% | 0.15420 | $420 |
| $32 | 1.505150 | 22.2492% | 0.29801 | $2,909 |
| $100 | 2.000000 | 43.5920% | 0.39378 | $14,086 |
| $320 | 2.505150 | 67.4977% | 0.35992 | $50,202 |
| $1,000 | 3.000000 | 85.4557% | 0.22839 | $118,523 |
| $3,200 | 3.505150 | 95.2659% | 0.09873 | $206,014 |
| $10,000 | 4.000000 | 98.8507% | 0.03008 | $236,600 |
| $32,000 | 4.505150 | 99.8066% | 0.00615 | $200,724 |
| $100,000 | 5.000000 | 99.9760% | 0.00090 | $111,788 |
| $320,000 | 5.505150 | 99.9980% | 0.00009 | $46,277 |
| $1,000,000 | 6.000000 | 99.9999% | 0.00001 | $12,457 |
| | | | | $1,000,000 |
| SEM | 0.025973503 | | | |

The theoretical claim distribution is created from parameters provided by carriers. Carriers provide a forecast of the coming (renewal) year's aggregate claim total for the group (See "Claims" of $1,000,000 in the Table 1 example). Carriers also provide upon request, and in conjunction with their specific stop loss (SSL) insurance quotes, the probabilities of claims at the quoted reinsurance levels. Note that these large claim probabilities vary by carrier and are a function of provider contract provisions as well as risk-pool characteristics. In the Table 1 example, we assume the carrier has cited the probability of a $100,000 claimant as 9 in 10,000 (see "Probability" column, $100,000 claim row for the given 0.0009 probability). Given these parameters, a unique normal distribution (defined by its mean and standard deviation) can be constructed, such that the area under the curve equals the projected claim total (in this case, $1,000,000), and the chosen large case probability equals the target value (in this case 0.0009 at $100,000). Using a spreadsheet tool such as Microsoft Excel, one can find the mean and standard deviation by a manual iterative process, or one can use a program such as the "Solver" utility in Excel.

In Table 1, note that the "Clms" column represents claims at various levels that will be examined, and "Log Clms" is comprised of the base-10 logarithms of corresponding "Clms" levels. The "% Less" column is the cumulative distribution function for the normal distribution of specified mean and standard deviation (portion of the distribution left of the corresponding "Clms" value. The "Prob." Column is the probability mass function for the same distribution and set of reference "Clms" values. The "$ per band" column estimates the cumulative dollars in the range of claim values between the applicable level and the level represented in its preceding row. For example, the $2,909 in the $32 claim row is calculated by multiplying the percent of claimants between the $32 and $10 levels (22.25% minus 8.40%) by the membership (1,000) by the estimated average claims in that interval (in the Table 1 example, the simple average of $10 and $32, or $21 is used).

Also of note is the standard error of the mean (SEM, which in this case is 0.02496) of this distribution. SEM is defined as the standard deviation (SD=0.78933) divided by the square root of n (the membership, 1000). The SEM of this distribution of individual claimants will be used later in FUNDING SELECT℠ as the standard deviation of the distribution of possible group aggregate total claims.

Returning to the derivation of the $50 deductible's impact on out-of-pocket costs and premiums, we turn our attention to Table 2, below. Using the information derived in Table 1, above, VALUE SELECT℠ creates bands of claimants (defined in Table 2 by "Clm Min" and "Clm Max"). The average claim level in the band is taken as the simple average in the "Band Ave" column. The percent of membership in each band is derived from Table 1 and displayed in the "Mbr in band" column. Next, out of pocket amounts are calculated for each band, with and without the influence of the deductible. As discussed above, product A has 10% out-of-pocket costs, so the "OOP wo Ded" is 10% of the "Band Ave" cost. Out-of-pocket amounts in the presence of the deductible ("OOP w Ded") equal the "Band Ave" claim total if that amount is less than or equal to the deductible. For claim amounts greater than the deductible, the out-of-pocket amount is the deductible plus 10% of the claim-deductible difference. The weighted average columns are derived by multiplying the OOP columns (with and without deductible) by the membership percents in each claim band. The totals of the weighted average columns represent the average per member out-of-pocket costs with and without the deductible. The difference (in the Table 2 example, $37.98) is the per member out-of-pocket impact of the deductible. (Note that the derivation of Product A's $200 expected annual out-of-pocket cost was on a per employee basis. This explains how the "OOP wo Ded" column in Table 2 can total only $100.)

ferent value, and pricing spreads reflect a blend of the two (or simply what the market will bear).

When comparing an alternative product to a standard index product, it is generally true that the two will differ with respect to many attributes, some of which will fall into each of the three categories described above. The marginal effects of each difference are assessed according to the methods described above, then totaled to generate the expected premium, which is then juxtaposed against the actual premium to produce the VALUE SELECT℠ value index. The result is a unique and useful "apples-to-apples" comparison of insurance product value, which is otherwise unavailable in the marketplace.

II. Selection of a Health Plan Funding Arrangement

FUNDING SELECT℠

Groups of more than 100 employees often have options with respect to their so-called "funding arrangement" (i.e., whether they are fully insured or self-insured). Those groups need methods to evaluate their options, and the FUNDING SELECT℠ module provides unique and useful methods. Groups that are fully insured need to evaluate the risks and rewards of self-funding, and to compare competing self-funded quotes to one another. Groups that are self-funded, and are committed to remaining self-funded, need to evaluate and optimize the value of the "reinsurance", or stop-loss insurance that they purchase.

TABLE 2

Derivation of the Impact of a $50 Deductible

| Clm Min | Clm Max | Band Ave | Mbr in band | OOP wo Ded | Wt. Ave | OOP w Ded | Wt. Ave |
|---|---|---|---|---|---|---|---|
| $0 | $10 | $5 | 8.3975% | $0.50 | $0.04 | $5.00 | $0.42 |
| $10 | $32 | $21 | 13.8518% | $2.10 | $0.29 | $21.00 | $2.91 |
| $32 | $100 | $66 | 21.3428% | $6.60 | $1.41 | $51.60 | $11.01 |
| $100 | $320 | $210 | 23.9057% | $21.00 | $5.02 | $66.00 | $15.78 |
| $320 | $1,000 | $660 | 17.9580% | $66.00 | $11.85 | $111.00 | $19.93 |
| $1,000 | $3,200 | $2,100 | 9.8102% | $210.00 | $20.60 | $255.00 | $25.02 |
| $3,200 | $10,000 | $6,600 | 3.5848% | $660.00 | $23.66 | $705.00 | $25.27 |
| $10,000 | $32,000 | $21,000 | 0.9558% | $2,100.00 | $20.07 | $2,145.00 | $20.50 |
| $32,000 | $100,000 | $66,000 | 0.1694% | $6,600.00 | $11.18 | $6,645.00 | $11.26 |
| $100,000 | $320,000 | $210,000 | 0.0220% | $21,000.00 | $4.62 | $21,045.00 | $4.63 |
| $320,000 | $1,000,000 | $660,000 | 0.0019% | $66,000.00 | $1.25 | $66,045.00 | $1.25 |
|  |  |  | 100.00% |  | $100.00 |  | $137.98 |

In the example, the average per employee out-of-pocket cost without the $50 deductible is $200. If the member to employee ratio is 2:1, the per employee out-of-pocket impact of the deductible is 2×$38 (rounded from $37.98), or $76. To determine the impact of this out-of-pocket increment on expected premium, this result is multiplied by a behavioral multiplier. If the behavioral multiplier were 2.0, then one would expect Product C to cost $152 (per employee-year) less than Product A.

The third category of benefit design features impacting premium (e.g., "gate keeping", formulary richness, networks and out-of-network benefits) is handled empirically in VALUE SELECT℠ at the discretion of the user. Many carriers use fixed-percentage premium spreads for these attributes, and the qualified user of VALUE SELECT℠ will be familiar with these industry practices. VALUE SELECT℠ inputs can reflect customer values in this realm where actuarial research yields one value, survey research yields a dif- The FUNDING SELECT℠ module is dependent upon the construction of probability distributions for both individual and aggregate claims. This is accomplished using theoretically derived models, because empirically based distributions are lacking in the customer environment. The critical insight, uniquely applied here, is that the logarithms of claim costs are distributed normally. FUNDING SELECT℠ constructs two model claim distributions: one for annual totals of individuals within the group, and another for the group's possible aggregate total claims. The first claim distribution constructed is the distribution of individual (annual) claim totals within the group. An example of such a distribution is given in Table 1, which was presented and discussed in the VALUE SELECT℠ section, above.

Once created, this distribution makes it possible to examine the portion of claims and claimants that will likely be above or below various cut-offs. For example, the claimants to the right of potential specific stop-loss (SSL) levels can be evaluated to estimate likely benefit payouts from various levels of SSL insurance. In the Table 3, below, estimation of the amount that would exceed a $100,000 SSL insurance level is illustrated. Claimant bands from Table 1 are adjusted to remove the effects of claims greater than the stop-loss amount. (Note that for a $300,000 claimant, the whole $300,000 contributes to "$ per band" in Table 1, but the benefit of SSL at the $100,000 level is $200,000. Table 3 illustrates a simple method for estimating the portion for which SSL benefits are applicable.) The conclusion from Table 3 is that the mean expectation for SSL benefit payout is $34,810.

TABLE 3

Estimation of Claim-Cost Attenuation By $100,000 Specific Stop-Loss Insurance

| Clm Min | Clm Max | Band Ave | % > $100 K | $ in band | $ > $100 K |
|---|---|---|---|---|---|
| $100,000 | $320,000 | $210,000 | 52.38% | $46,277 | $24,240 |
| $320,000 | $1,000,000 | $660,000 | 84.85% | $12,457 | $10,570 |
| | | | | | $34,810 |

Also, one can estimate the probability that an individual will incur claims at any particular level of interest (for example, an SSL cut-off level). By applying the binomial distribution to the latter, one can determine the probabilities that n cases of any chosen size will occur (typically, case sizes of interest are those corresponding to potential SSL insurance levels). FUNDING SELECT$^{SM}$ permits comparison of SSL level x to SSL level y by juxtaposing premium differences and potential claim-cost differences, with probabilities for various numbers of large cases that might occur. Thus, using FUNDING SELECT$^{SM}$, one can determine the SSL level that is appropriate for the risk tolerance of the group.

Of course, the group's claim total for the coming year will not likely be exactly as forecast by the carrier. FUNDING SELECT$^{SM}$ employs a predictive (and original) model to assess possible aggregate claim totals for the group. The model used in FUNDING SELECT$^{SM}$ is a normal probability distribution with a mean that is the log of the most likely total, and a standard deviation that is the standard error of the mean of the lognormal distribution of individual claimants, as described above and illustrated in Table 1. Using this model, illustrated in Table 4, below, FUNDING SELECT$^{SM}$ calculates the probability that aggregate claim totals will be less than various percentage percentages of the predicted level, e.g., 80%, 90%, 100%, 110%, et cetera. The "Cum. Prob." is the area under the curve to the left of each "Clms Pred." amount, and the "Prob." is the height of the ordinate at each level.

TABLE 4

Group Aggregate Claim-Cost Probabilities

| Clms Pred. $1,000,000 Clms | SD 0.0259735 % of Pred. | Mean 6.000000 Log Clms | Cum. Prob. | Prob. |
|---|---|---|---|---|
| $700,000 | 70% | 5.845098 | 0.00000% | 0.0000000 |
| $750,000 | 75% | 5.875061 | 0.00008% | 0.0000038 |
| $800,000 | 80% | 5.903090 | 0.00953% | 0.0003784 |
| $850,000 | 85% | 5.929419 | 0.32896% | 0.0099405 |
| $900,000 | 90% | 5.954243 | 3.90600% | 0.0845231 |
| $950,000 | 95% | 5.977724 | 19.55405% | 0.2761730 |
| $1,000,000 | 100% | 6.000000 | 50.00000% | 0.3989423 |
| $1,050,000 | 105% | 6.021189 | 79.26941% | 0.2860161 |
| $1,100,000 | 110% | 6.041393 | 94.44928% | 0.1120512 |
| $1,150,000 | 115% | 6.060698 | 99.02782% | 0.0260035 |
| $1,200,000 | 120% | 6.079181 | 99.88501% | 0.0038268 |
| $1,250,000 | 125% | 6.096910 | 99.99047% | 0.0003784 |
| $1,300,000 | 130% | 6.113943 | 99.99942% | 0.0000264 |

It is worth noting that users of FUNDING SELECT$^{SM}$ need not assume that the carrier's forecast is truly most likely. For example, carriers often build in no expectation of payout from SSL insurance, even though the group is large enough for some payout to be likely. FUNDING SELECT$^{SM}$ permits the user to adjust the distribution by the amount of likely SSL payout, the estimation of which is addressed above. Calculated probabilities of various aggregate claim totals are used in FUNDING SELECT$^{SM}$ for to two distinct purposes, described below.

First, FUNDING SELECT$^{SM}$ displays in tabular form the group's total cost for various self-funded arrangements across a spectrum of potential claim costs, with probabilities ascribed to the various claim levels (see Table 5, below). Probabilities for the various claim levels are calculated using the model described above and illustrated in Table 4. Total costs are a function of many line item costs that fall into three principal categories: claim costs, reinsurance premiums, and administrative fees. Details vary from carrier to carrier and proposal to proposal, but typically some of these line items are fixed and some of them are variable. Some costs are a function of claims, while others are a function of enrollment. Some are attenuated by stop-loss insurance, while others are open-ended. FUNDING SELECT$^{SM}$ calculates and totals these costs as they would occur at the various claim levels modeled. These totals can be compared to fully insured premiums for the same set of benefits, or can be compared to other self-funded benefit designs. FUNDING SELECT$^{SM}$ provides customers with a unique and succinct "bottom-line" set of probabilities that self-funding (as opposed to fully-insuring) will produce net losses or net gains of various amounts.

TABLE 5

Self-Funding vs. Fully-Insuring Across Claim Probability Spectrum

| % of Pred | 90% | 95% | 100% | 105% |
|---|---|---|---|---|
| Claims | $900,000 | $950,000 | $1,000,000 | $1,050,000 |
| Cum. Prob | 3.9060% | 19.5541% | 50.0000% | 79.2694% |
| Adm. Fees | $47,059 | $47,059 | $47,059 | $47,059 |
| SL Prem | $105,882 | $105,882 | $105,882 | $105,882 |
| Tot. SF Cost | $1,052,941 | $1,102,941 | $1,152,941 | $1,202,941 |
| Fl Quote | $1,252,941 | $1,252,941 | $1,252,941 | $1,252,941 |
| Sav./Loss | $200,000 | $150,000 | $100,000 | $50,000 |

TABLE 5-continued

Self-Funding vs. Fully-Insuring Across Claim Probability Spectrum

| % of Pred | 110% | 115% | 120% |
|---|---|---|---|
| Claims | $1,100,000 | $1,150,000 | $1,200,000 |
| Cum. Prob | 94.4493% | 99.0278% | 99.8850% |
| Adm. Fees | $47,059 | $47,059 | $47,059 |
| SL Prem | $105,882 | $105,882 | $105,882 |
| Tot. SF Cost | $1,252,941 | $1,302,941 | $1,352,941 |
| Fl Quote | $1,252,941 | $1,252,941 | $1,252,941 |
| Sav./Loss | $0 | −$50,000 | −$100,000 |

The second application of aggregate claim total probabilities (shown in Table 4, above) is the evaluation of various potential aggregate stop loss (ASL) insurance levels. Typically, the carrier offers a choice of aggregate stop loss insurance levels (e.g., 110%, 115%, or 120% of predicted) from which the customer may choose. FUNDING SELECT$^{SM}$ calculates the probabilities that aggregate claim costs will exceed those levels, after the effects of specific stop loss insurance are taken into account (by shifting the mean, as described above). Users of FUNDING SELECT$^{SM}$ (and their group health insurance customers) can then consider the different premiums for different levels of ASL insurance in the context of the probabilities that claims will exceed those levels. In this way, the group can identify the ASO insurance level that is most appropriate for its level of risk tolerance.

III. Tracking of a Health Plan Group's Claim History

COST TRACKER$^{SM}$

Groups of more than 100 employees generally receive from their carriers or administrators, periodic reporting on the group's claim experience. Fully insured groups generally receive quarterly reports, and self-funded groups generally receive monthly reports and/or accounting statements. These reports contain much potentially useful data, but typically do not synthesize and analyze the data to produce useful information for plan-management decision-making. The COST TRACKER$^{SM}$ module is a tool (also a service) that calculates run rates and trends in the major cost categories amenable to benefit design changes and other plan-management interventions. The mathematical methods involved are well known (rolling averages and linear regression), but a concise package of run rates and trends based upon rolling averages and regression models has not previously been marketed to purchasers of group health insurance.

The COST TRACKER$^{SM}$ module uses two years of claim data (when available) to calculate rolling averages of costs (by major category) and enrollment for the most recent year. Then, linear regression is used to model the 12 most recent rolling twelve-month averages, or 4 most recent rolling four-quarter averages. The resulting linear equations (with slopes and intercepts calculated by regression) are used to calculate current run rates, project future run rates and characterize trends. Typical group reporting, if provided at all, characterizes run rates based upon values for the most recent time period, or upon averages of several recent time periods. In the case of the former method, random, seasonal, or other types of variation in the most recent reporting period can create a misleading picture of the true underlying run rate. In the case of the latter method, older values contributing to the average bias the estimation of run rates toward older (and generally lower) levels. In contrast, COST TRACKER$^{SM}$ calculates the run rates for current (or future) time periods using the slopes and intercepts obtained by regressing relatively stable rolling averages against time. In this way, the COST TRACKER$^{SM}$ estimation of run rates is appropriate to the reported time frame, and is representative of true underlying run rates (since seasonality and random variations are damped out). Similarly, trends calculated by COST TRACKER$^{SM}$ are representative of true underlying trends since they are calculated from regression line slopes divided by calculated run rates. These techniques have not been applied commercially for the production of group reports. The unique application of these methods in COST TRACKER$^{SM}$ contrasts favorably to the standard method of reporting trends as the ratio of costs in two different time periods.

IV. Selection of a Health Plan's Benefit Features

BENEFIT MANAGER$^{SM}$

Fixed co-payments, deductibles and out-of-pocket maxima are standard features of benefit design. If these features remain constant over time, while premium costs increase, a Plan's index of richness (a BENEFIT SELECT$^{SM}$ concept discussed in the VALUE SELECT$^{SM}$ section above) will decrease. When this happens, "co-payment leveraging" is lost, and intended behavioral effects of the fixed benefit features are diminished. As a result, employers experience cost increases greater than ambient health-care inflation. For an employer that wishes to maintain a constant index of richness over time to avoid these effects, or for an employer that needs a different index of richness to compete in the labor market more efficiently or effectively, BENEFIT MANAGER$^{SM}$ provides a tool for multiyear benefit design planning.

The BENEFIT MANAGER$^{SM}$ approach is novel, unique and original in two ways. First, explicit quantitative consideration of multiyear benefit design strategy, within the overall context of an integrated plan management method, is an innovation of BENEFIT SELECT$^{SM}$. Second, the method of quantitative analysis employed in BENEFIT MANAGER$^{SM}$ is dependent upon the unique BENEFIT SELECT$^{SM}$ method of estimating out-of-pocket costs (discussed in the VALUE SELECT$^{SM}$ section, above) and novel concept of index-of-richness (also discussed in the VALUE SELECT$^{SM}$ section, above). The value of modeling benefit design changes that can maintain certain levels of out-of-pocket costs (and richness) is intuitive. However, this planning exercise is impossible without a means of estimating increments or decrements in out-of-pocket costs that will occur as a function of marginal changes in benefit design (e.g., co-payment changes). BENEFIT MANAGER$^{SM}$ supplies a means of doing just that by multiplying increments and decrements in each benefit design category by normative utilization levels for those same categories, and then totaling the results. BENEFIT MANAG- ER$^{SM}$ allows the user to test the effects of specific potential benefit design changes on future out-of-pocket costs and richness indices.

V. Formulation of a Health Plan's Contribution Strategy

CONTRIBUTION MANAGER$^{SM}$

Employers typically contribute some, but not the entire health insurance premium that covers employees and their dependents. Employees contribute the remainder, generally through payroll deduction. By policy and/or strategy ("contribution strategy") employers typically contribute fixed dollar amounts or fixed percentages of premium for employees and their dependents. Often, but not always, contribution amounts differ for employees and dependents (e.g., the company might contribute 90% of premium for employees, but 50% of premium for dependents). Contribution strategy is a major factor in labor market competition for employers (as important as the health plans they offer). Contributions that are too lean diminish competitiveness in the labor market, and can potentially create insufficient enrollment to maintain a viable risk pool. On the other hand, contributions that are too rich (particularly for dependents) can lead to adverse selection dynamics and increased cost. CONTRIBUTION MANAGER$^{SM}$ provides a multiyear planning tool that facilitates the testing of potential contribution strategies against the backdrop of annual premium increases.

CONTRIBUTION MANAGER$^{SM}$ takes as its inputs current premiums and enrollment levels, anticipated rates of increase in future years, and current employee (and/or employer) contributions to premium (in dollars). CONTRIBUTION MANAGER$^{SM}$ calculates the percent of premium contributed on a per employee and per dependent basis. These percents are not always obvious, and their calculation not always intuitive, particularly for groups with multi-tiered rate structures. Calculations generally require application of algebraic concepts that are imbedded into CONTRIBUTION MANAGER$^{SM}$. Once basic inputs are made, CONTRIBUTION MANAGER$^{SM}$ allows the user to test multiple future contribution scenarios by entering potential contribution levels for employees and dependents in future years. CONTRIBUTION MANAGER$^{SM}$ enables the user to create multiyear plans that phase-in changes that may be necessary for a health plan's stability, viability, and/or competitiveness in the labor market. CONTRIBUTION MANAGER$^{SM}$ compares each scenario tested to a base case scenario, and calculates the difference in annual and cumulative economic outcomes between the two scenarios.

As is evident from the foregoing, the disclosed use of a quantitative analysis using mathematical models allows a decision maker to synthesize a broad range of issues and attributes when analyzing and selecting health care plans. The use of these methods enables more informed and forward-thinking decisions to be made.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A computer-implemented method for comparing health insurance products comprising the steps of:
    selecting a standard health insurance product having a standard premium and standard benefit design features;
    selecting an alternative health insurance product having an actual premium and a plurality of benefit design features different from the standard product;
    calculating an expected premium for the alternative product that is based on multiple categories of departures from the standard premium as a result of the accompanying departures in benefit design features;
    wherein the calculation of the expected premium comprises two or three step that correspond to the categories of departure from the standard premium, the steps selected from the group consisting of:
    (a) when comparing standard and alternative health insurance products having co-payment or coinsurance amounts, multiplying co-payment or coinsurance payment increments and decrements by typical utilization or cost levels, and then multiplying the foregoing result by a behavioral multiplier for a type of service,
    (b) when comparing standard and alternative health insurance products having deductibles and out-of-pocket maxima, assessing those deductibles and out-of-pocket maxima using a statistical analysis of these benefit design features, and
    (c) assigning a premium impact for a benefit design feature based on industry knowledge or research, or on customer preference;
    calculating by a computer a value index for the alternative product, the value index being the ratio of the expected premium, as compared with the standard premium, to the actual premium of the alternative product;
    using the value index to compare the alternative and standard health insurance products.

2. A method as described in claim 1, further comprising selecting a plurality of alternative health insurance products, calculating a value index for each of the alternative health insurance products, and using each of the calculated value indices to compare each of the alternative and standard health insurance products.

3. A method as described in claim 1, wherein the standard health insurance product is an incumbent health insurance product.

4. A method as described in claim 1, wherein the value index calculation comprises accounting for differences in co-payment or coinsurance amounts between the alternative and standard products.

5. A method as described in claim 4, wherein the calculation of the expected premium impact of co-payment or coinsurance differences comprises the steps of:
    (a) multiplying co-payment or coinsurance payment increments and decrements by typical utilization or cost levels; and
    (b) multiplying the result of step (a) by a behavioral multiplier for a type of service.

6. A method as described in claim 1, wherein the value index calculation comprises an assessment of alternative and standard products deductibles and out-of-pocket maxima.

7. A method as described in claim 6, wherein the assessment of deductibles and out-of-pocket maxima includes (a) generating theoretical, log normal claim distributions, (b) generating derivative out-of-pocket costs, and (c) modeling the deductibles and out-of-pocket maxima at a plurality of claim levels.

8. A method as described in claim 1, wherein the value index calculation comprises assigning a discretionary premium impact value for a predetermined benefit difference between the alternative and standard products.

9. A method as described in claim 1, wherein the value index is a single number.

* * * * *